United States Patent
Gilbert et al.

(10) Patent No.: US 6,849,225 B1
(45) Date of Patent: Feb. 1, 2005

(54) METHOD OF PRODUCING A PLASTIC MOULDED PART INCLUDING AN EXTERNAL COVERING

(75) Inventors: Robert William Gilbert, Willunga (AU); Duncan William Nash, Happy Valley (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 10/030,887

(22) PCT Filed: May 8, 2000

(86) PCT No.: PCT/AU00/00413

§ 371 (c)(1),
(2), (4) Date: Jun. 12, 2002

(87) PCT Pub. No.: WO00/67983

PCT Pub. Date: Nov. 16, 2000

(30) Foreign Application Priority Data

May 7, 1999 (AU) ............................................... PQ0237

(51) Int. Cl.[7] .......................... B29C 45/14; B29C 45/16
(52) U.S. Cl. ...................... 264/511; 264/163; 264/266; 425/112; 425/129.1; 425/298; 425/DIG. 58
(58) Field of Search ................................ 264/163, 511, 264/266, 510, 318; 425/298, 299, 129.1, 112, DIG. 58

(56) References Cited

U.S. PATENT DOCUMENTS

| | | | | |
|---|---|---|---|---|
| 4,793,793 A | * | 12/1988 | Swenson et al. | 425/503 |
| 5,238,640 A | * | 8/1993 | Masui et al. | 264/266 |
| 5,622,667 A | * | 4/1997 | Fujiyama et al. | 264/266 |
| 6,090,336 A | * | 7/2000 | Hirmer et al. | 264/511 |
| 6,096,251 A | * | 8/2000 | D'Hooren | 264/163 |

FOREIGN PATENT DOCUMENTS

| | | | |
|---|---|---|---|
| EP | 186015 | * | 7/1986 |
| JP | 60220719 A | | 11/1985 |
| JP | 63030220 A | | 2/1988 |
| JP | 08156015 A | | 6/1996 |
| JP | 08174601 A | | 7/1996 |
| JP | 09150432 A | | 6/1997 |
| JP | 10211632 A | | 8/1998 |

* cited by examiner

*Primary Examiner*—Jill L. Heitbrink
(74) *Attorney, Agent, or Firm*—Warn, Hoffmann, Miller & LaLone, P.C.

(57) ABSTRACT

The present invention is a mould and a method of moulding a plastic component using the mould that enable the manufacturer of a moulded component (45) which has an external covering. The method of moulding comprises either locating a pre-formed component (41) into a first part of the mould or vacuum forming a thin film (40) into a mould cavity. A first mould part (15) has a mould cavity into which the pre-formed component (41) is placed or the thin film (40) is vacuumed formed into. The method continues by partly closing a second part of the mould (25) into the first part of the mould (15) and injecting molten plastic (34) onto the surface of the pre-formed component (41) or thin film (40). The second mould part (25) is then fully closed to force the molten plastic (34) to fill the resultant mould cavity (36). This bonds the molten plastic to either the pre-formed component (41) or the thin film (40) to form the final shape of the moulded component (45). Just prior to the mould parts (15) and (25) closing, a cutting edge (28) abuts against and cuts either the pre-formed component (41) or the thin film (40). This trimming occurs around the periphery of the cutting edge (28). The moulded component (45) is then ejected by opening of the mould parts (15) and (25). This process enables the production of a moulded component (45) with an external covering.

16 Claims, 5 Drawing Sheets

METHOD OF PRODUCING A PLASTIC MOULDED PART INCLUDING AN EXTERNAL COVERING

BACKGROUND OF THE INVENTION

Moulding, and in particular injection moulding, is used in many applications to mass produce plastics components at low unit cost. A characteristic of the conventional injection moulding process is that, because only one plastics material is injected into the mould, the resultant component has relatively uniform properties throughout. In applications where different material properties are required for different areas of a component, this can produce difficulties and/or result in the need for further steps to produce a final product. For instance, in many applications it is desirable to change the surface characteristics of a plastics component produced by injection moulding (to provide hardness, colour, reflectivity etc.).

One way of changing the surface properties of a part produced by injection moulding is to cover (partially or fully) that part with a film. Such a film may add abrasion resistance, colour, or reflectivity for instance.

The addition of a film after the injection moulding process adds cost and complexity to the production of plastics moulded parts having a film covering.

By way of example, it is known to apply thin plastic film to a vehicle external mirror housing to provide colour matching to that of the body of the vehicle and to add abrasion resistance. Known techniques for such application add complexity to the production of mirror housings.

It is an object of the present invention to provide an improved method of producing a plastics moulded part having an external covering.

SUMMARY OF THE INVENTION

According to a first aspect of the invention, a method of moulding a plastic component comprises locating a first pre-formed component into a first part of a mould having at least two components that, when closed, form a mould cavity, partly closing said mould, injecting molten plastic into said mould cavity on one side of said pre-formed component, and closing said mould to force said molten plastic to fill said mould cavity and to bond to said one side of said pre-formed component, one part of said mould having a cutting edge that engages against and trims said pre-formed component around said cutting edge upon closure of said mould components.

Preferably the pre-formed component is a generally concave component which may have a thin wall. The section of the peripheral edge of the pre-formed component may be curved inwardly towards the centre of the component. The cutting action of the mould parts trim the peripheral edge of the preformed component adjacent the inwardly curved section flush with the plastic which is moulded onto the internal surface of the preformed component. This enables a component to be moulded that has a smooth and uninterrupted surface to the point where the trimming occurs.

In the case of a pre-formed component where the peripheral edge curves in towards the centre of the part, this will obviously result in an undercut surface which is located between the outer edge of the pre-formed component and the edge where the trimming of the pre-formed component occurs. In order to ensure that such component can be released from the various mould parts, an intermediate or third mould part can be located between the first female and second male parts of the mould. This intermediate part will have an aperture through which the male component locates. Also, it is provided with an undercut recess against which the inwardly curved peripheral edge of the pre-formed component locates. Separation of the female and intermediate parts will then enable release of the finished moulded component.

Preferably, the pre-formed component is sufficiently resilient to enable it to be located within the cavity formed by both the first and intermediate mould parts. The peripheral edge of the pre-formed component extends beyond the undercut recess so that it overlies the region against which the cutting edge abuts. Preferably, the cutting edge abuts the intermediate mould part close to the end of the undercut recess.

The moulding technique relies on injecting the required amount of molten plastic into the mould cavity prior to final closure of the mould parts. Once this occurs, sufficient closing pressure is applied to ensure that the molten plastic forms fully into the mould cavity as the components close. Just prior to final closure of the mould parts, the cutting edge abuts against the pre-formed component. Continued closure results in the cutting edge continuing to press into the pre-formed component until the cutting edge finally abuts against another surface of an adjacent mould part. This results in the preformed component being trimmed around the cutting edge.

In addition to a method of moulding a plastic component, the invention according to its first aspect also comprises a mould for moulding the plastic component comprising a first part of a mould having a cavity into which a pre-formed component is located, a second part of said mould that locates into the cavity of said first part and forms a mould cavity between said second part and said pre-formed component, and a cutting edge on at least one of said parts of said mould that engages against and trims said pre-formed component around said cutting edge upon closure of said mould components wherein said mould parts are partly closed prior to molten plastic being injected into said mould cavity on one side of said preformed component and then fully closed to force said molten plastic to fill said mould cavity and to trim said pre-formed component.

In a further aspect of the invention, a method of moulding a plastic component in a mould having at least a male and female mould parts that form a mould cavity when said mould is closed, comprises locating a softened film of plastic over the recess of the female part of said mould, drawing a vacuum within the recess of said female part of said mould that causes said film of plastic to be vacuum formed onto the surface of said female part of said mould, partly closing said mould, injecting molten plastic into said mould cavity on one side of said plastic film, and closing said mould to force said molten plastic to fill said mould cavity and to bond to said one side of said plastic film, one of said mould parts having a cutting edge against which another part of said mould locates so that the cutting edge trims said plastic film around said cutting edge upon closure of said mould parts.

Preferably, the method further comprises an intermediate mould part that has surfaces defining an aperture through which the male mould part locates and an undercut recess that locates adjacent the opening of the female mould part when the intermediate mould part is closed against the female mould part. In this case, the vacuum forming of the plastic film results in the film abutting against the aperture and undercut recess of the intermediate mould part.

In relation to all aspects of the invention, two halves of the mould may each have a cutting edge that engage upon closure of the halves. The cutting edges may act to cut a pre-formed or vacuum moulded component by the cutting edges moving past one another.

A still further aspect of the invention may also comprise a mould for moulding a plastic component comprising a first part of a mould having a cavity into which a pre-formed component is located, a second part of said mould that locates into the cavity of said first part and forms a mould cavity between said second part and said pre-formed component, and a cutting edge on said first and second mould parts that trim said pre-formed components around said cutting edges when said cutting edges engage upon closing of said first and second mould parts, wherein said mould parts are partly closed prior to molten plastic being injected into said mould cavity on one side of said pre-formed component and then fully closed to force said molten plastic to fill said mould cavity and to trim said pre-formed component.

In addition to the moulding process which is used in all of the abovementioned aspects of the invention, where a pre-determined amount of molten plastic is injected into a mould cavity when the mould parts are partially closed, the invention may also comprise a method of moulding and mould parts that involve injection of molten plastic when the mould parts are fully closed. This would result in the cutting edge trimming the pre-formed component or vacuum formed film prior to injection of molten plastic into the mould cavity.

Specific embodiments of the invention will now be described in some further detail with reference to and as illustrated in the accompanying figures. These embodiments are illustrative, and are not meant to be restrictive of the scope of the invention.

BRIEF DESCRIPTION OF THE DRAWINGS

A preferred method according to the invention is illustrated in the accompanying representations in which.

DETAILED DESCRIPTION OF PREFERRED EMBODIMENTS

Figure 1:
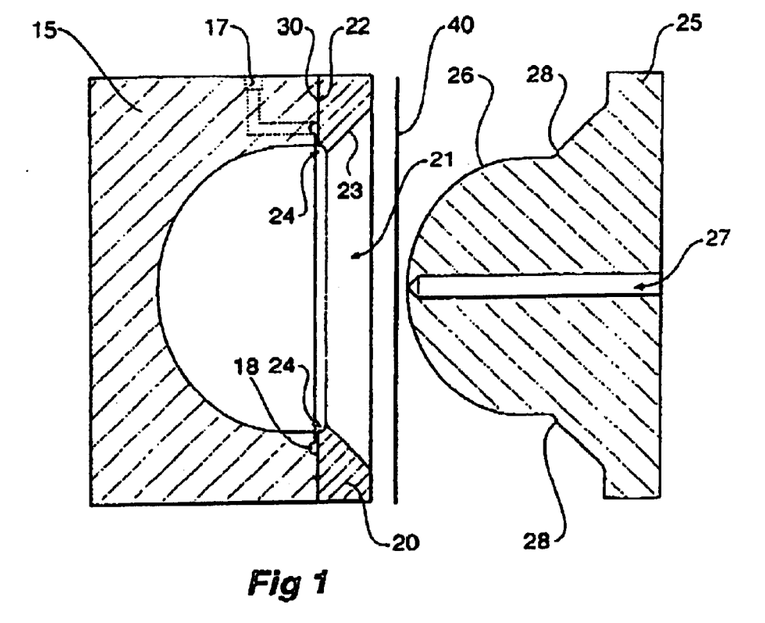
FIG. 1 shows a cross-sectional view of a three-part mould suitable for producing a moulded component having a thin film covering.

FIG. 1 shows a three-part mould comprising a female mould part 15, an intermediate mould part 20 and a male mould part 25. A conduit 27 is provided in the male part 25 to allow molten plastic to be injected into the mould cavity which is formed when the male mould 25 is inserted into the female mould part 15. FIG. 1 shows a vacuum conduit 17 communicating with a groove 18 which extends around the periphery of the cavity within the female mould part 15. The intermediate mould part 20 has a groove 22 within which a compressible seal 30 locates. The compressible seal 30 provides an airtight seal between the intermediate mould part 20 and the female mould part 15. This seal and the vacuum conduit 17 enable air to be evacuated from the mould cavity.

Figure 2:
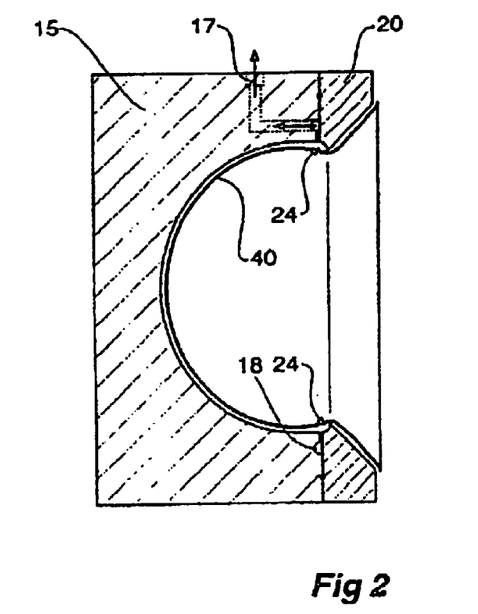
FIGS. 2 to 7 show cross-sectional views of the three-part die of FIG. 1 in progressive positions for producing a moulded component having a thin film covering.
Figure 3:
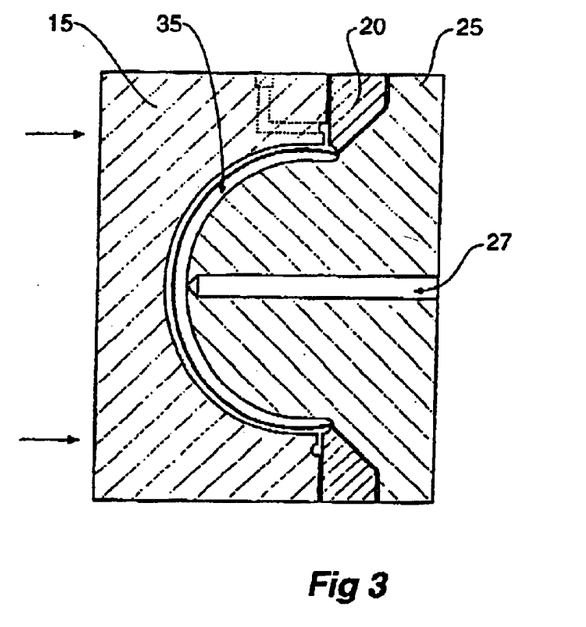

In this method of moulding a thin film 40 is placed against the intermediate mould part 20. The thin film 40 is heated to enable it to vacuum form into the female mould part 15. This is achieved by evacuating the air within the mould cavity by vacuum conduit 17 once the seal 30 is formed between the female mould and intermediate mould parts 15 and 20. The vacuum forming of the thin film 40 is shown at FIG. 2. The peripheral edge of the thin film 40 may be held with respect to the intermediate mould part 20 during the vacuum forming process.

The intermediate mould part 20 comprises an aperture 21 through which the male mould part locates. The aperture 21 is formed by a first surface 23 and a second surface which comprises an undercut recess 24. The term undercut is used as it describes a moulding surface having a larger diameter or undercut in relation to the minimum diameter of the aperture 21. In other words, a component formed within the cavity defined by the cavity within the female mould part and the undercut recess 24 of the intermediate mould part 20 could not be released from the mould cavity if the female and intermediate mould parts 15 and 20 are held together because of the portion formed on the moulded article by the undercut recess 24.

The male mould part 25 is provided with a cutting edge 28. In this embodiment, the cutting edge 28 extends around the periphery of the male mould part 25. Due to the taper of the first surface 23, the cutting edge 28 does not abut against the surface until the male mould part 25 is fully engaged with the other mould components 15 and 20. The cutting edge 28 abuts against and cuts through the thin film 40 which is positioned over the first surface 23 after the vacuum forming process. This has the effect of trimming the thin film 40 during the moulding process.

FIGS. 1 to 7 show the operation of the various mould components to produce a plastic component 45. The first stage of the process is shown in FIG. 1. In this stage, the female and intermediate mould parts 15 and 20 are held together. A heated thin film 40 is located over the aperture 21 and held in place. A vacuum is then applied by a vacuum conduit 17 to evacuate air from the mould cavity. This results in the thin film 40 forming into the mould cavity as shown in FIG. 2.

In the next step (FIG. 3) the male mould part 25 is partially inserted into the female mould part 15 through the aperture 21. This results in a first mould cavity 35 being formed between the thin film 40 and the male mould part 25.

Figure 4:
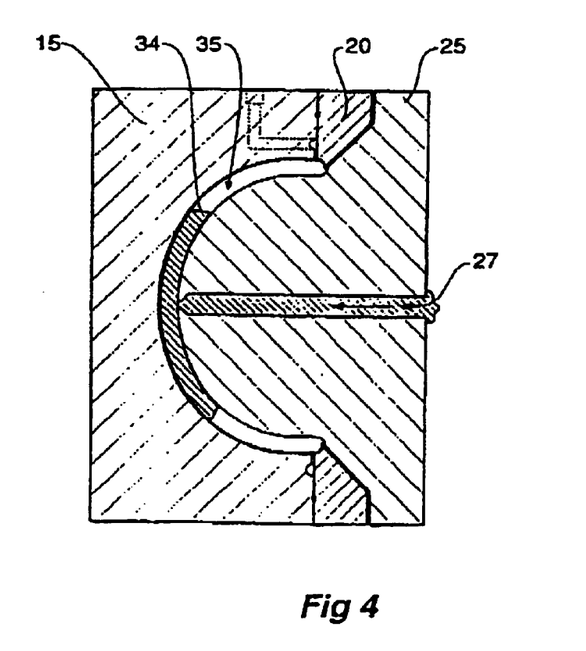

As shown in FIG. 4, a predetermined amount of molten plastic 34 is injected into the mould cavity 35 via conduit 27. The amount of molten plastic injected into the first mould cavity 35 is sufficient to fill the resultant mould cavity 36 when the mould component is fully closed.

Figure 5:
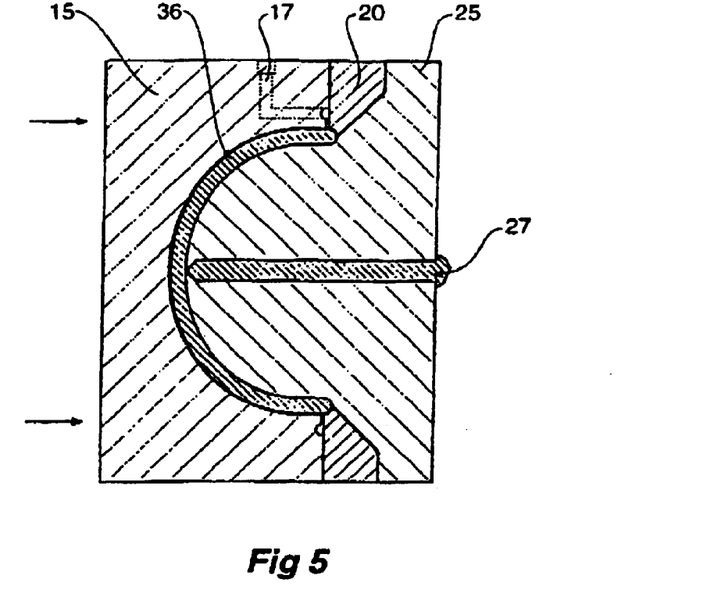

Once the required amount of molten plastic is injected into the first mould cavity 35, the male mould part 25 fully closes with respect to the mould parts 15 and 20. This is shown in FIG. 5. The male mould component 25 is used to compress the molten plastic 34 into the resultant mould cavity 36. In this process, the molten plastic is bonded and formed against the thin film 40. Bonding between the thin film 40 and the molten plastic results.

Just prior to the mould parts being fully closed, the cutting edge 28 abuts against the thin film 40 so that further insertion of the male mould part 25 results in the thin film 40 being cut around the periphery of the cutting edge 28. In this embodiment, the trimming of the thin film via the cutting action of cutting edge 28 occurs adjacent to the end of the undercut recess 24. This results in the thin film 40 being trimmed at a diameter which is smaller than the maximum diameter of the resulting component. The resultant mould cavity 36 tapers towards the point at which the thin film 40 is trimmed.

Figure 6:
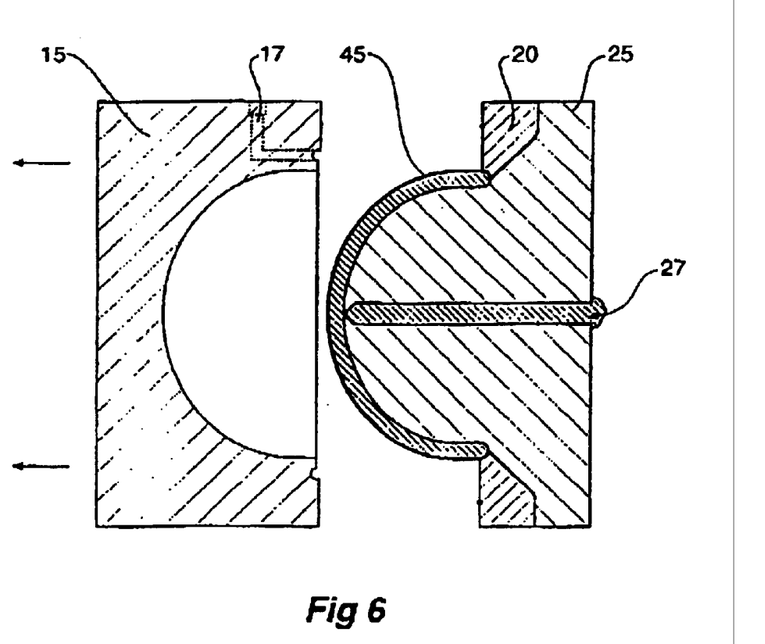
Figure 7:
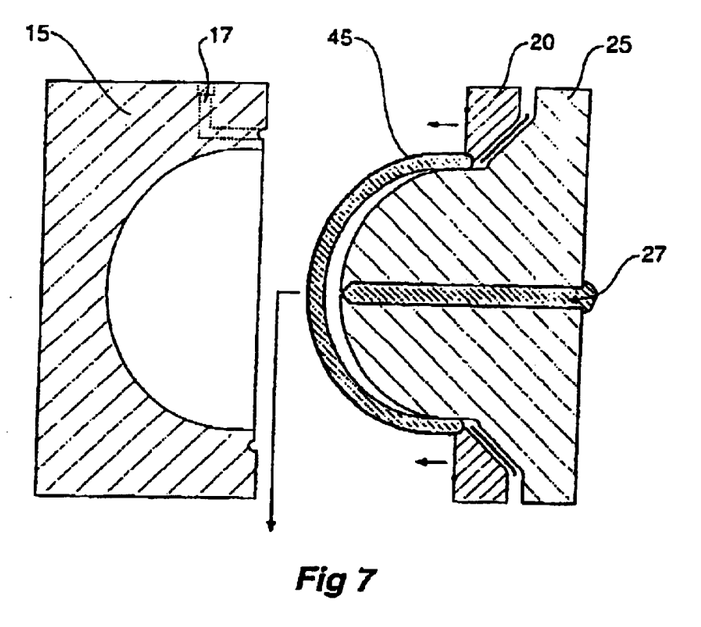

The ejection of the moulded component 45 is shown in FIGS. 6 and 7. First, the female mould part 15 is moved away from the moulded component 45. The male mould part 25 is then moved away from the intermediate mould part 20 whereupon the moulded component 45 can be ejected.

This moulding process enables a thin film covering to be formed on a moulded component 45. This covering is achieved within the one set of mould components and can result in the film covering peripheral edges of the moulded component which curve inwardly. The covering of such undercut surfaces would not be possible in a conventional two-part mould.

The thin film 40 may comprise a laminate having a clear abrasion resistant outer layer, a coloured middle layer and an inner layer of material that will readily bond to molten plastics. Suitable materials for the inner layer would include ABS and ASA plastics. These same plastics could then be used in a molten state to ensure bonding with the inner layer of the thin film 40.

Figure 9:
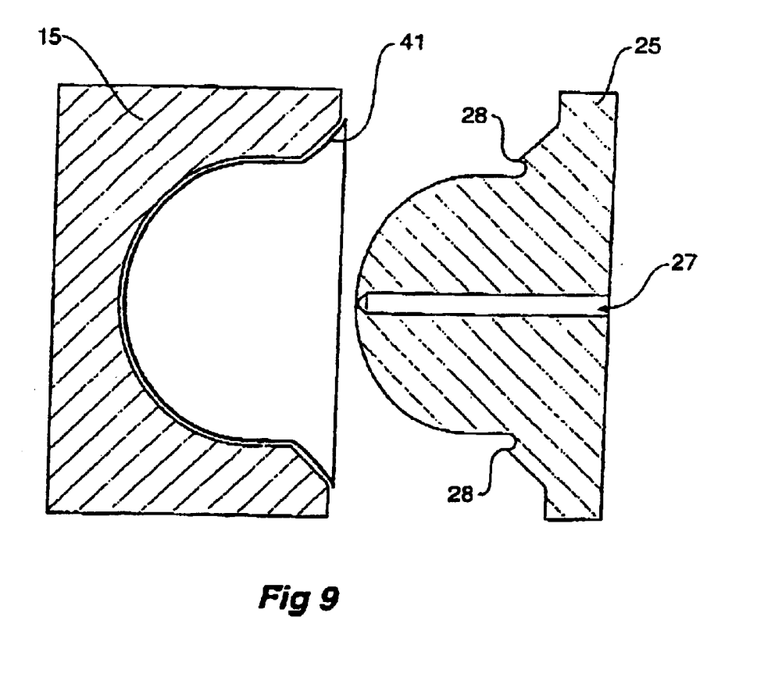
FIG. 9 shows a cross-sectional view of a two part mould for producing a moulded component having a thin film covering using a pre-formed component inserted into the mould cavity.

In another embodiment of the invention, the same mould components shown in FIGS. 1 to 7 could be used with a pre-formed moulded component. Instead of vacuum forming a thin film 40, a pre-formed component using either vacuum forming or injection moulding could be inserted into the mould cavity formed between the female and intermediate mould parts 15 and 20 shown in FIGS. 1 and 2. Provided that the pre-formed component was sufficiently resilient or thin, then it could be inserted through the aperture 21. This insertion would readily occur even if the pre-formed component had a surface which located within the undercut recess 24. The moulding process could also occur with a pre-formed component 41 that did not have an inwardly curved surface and that therefore did not require either an intermediate mould part 20 with an undercut recess 24. This is illustrated in FIG. 9. In this embodiment, the pre-formed component 41 would still be trimmed upon final closure of the mould part as illustrated in FIG. 5.

Figure 8:
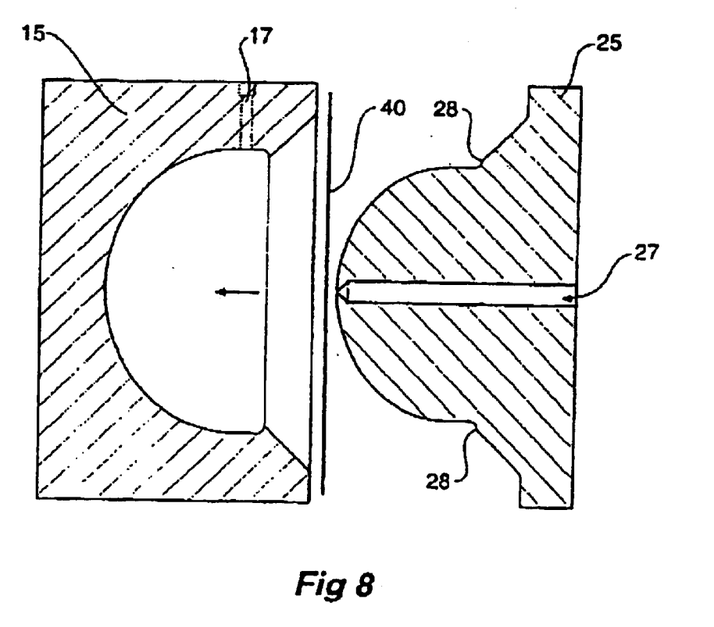
FIG. 8 shows a cross-sectional view of a two-part mould for producing a moulded component having a thin film covering.

In a further embodiment as illustrated in FIG. 8 the vacuum forming process could be used in a mould that comprised only a female and male mould part 15 and 25. In this case, the vacuum conduit 17 would open into the mould cavity of the female mould part 15 in order to vacuum form the thin film 40. Again, trimming the thin film 40 would occur at a point at which the male and female mould parts 15 and 25 are fully closed. In this case, the cutting edge 28 will abut against the internal surface of the mould cavity of the female mould part 15 and thereby trim the thin film 40.

Figure 10:
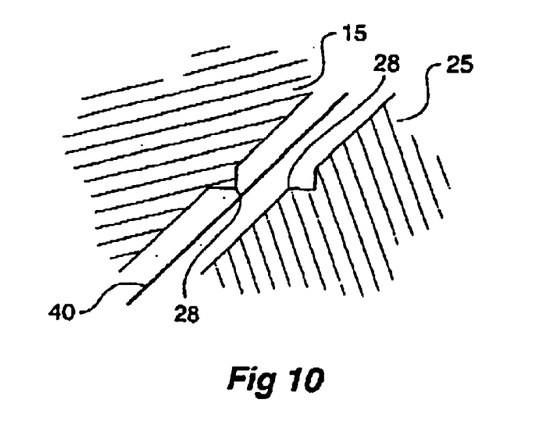
FIG. 10 shows a part-sectional view of a pair of cutting edges.

In addition to the cutting edge 28 described in the above embodiments, a pair of cutting edges 28 may be used on two of the mould parts. As shown in FIG. 10, these cutting edges 28 may either abut to trim either a pre-formed component or the thin film or alternatively may pass one another as shown in FIG. 10 so as to produce a cutting action for trimming the thin film 40 or pre-formed component 41.

While the present invention has been described in terms of preferred methods in order to facilitate their understanding of the invention, it should be appreciated that various modifications could be made to the embodiments without departing from the principles of the invention. Therefore, the invention should be understood to include all such modifications within its scope.

The claims defining the invention are as follows:

1. A method of moulding a plastic part comprising:
   locating a pre-formed material into a first part of a mould having at least two mould components that, when closed, form a mould cavity, wherein, an undercut recess is formed on the surface of one of said at least two mould components, partly closing said mould,
   injecting molten plastic into said mould cavity on one side of said pre-formed material, and
   closing said mould to force said molten plastic to fill said mould cavity and to bond to said one side of said pre-formed material, one part of said mould having a cutting edge that engages against and trims said pre-formed material around said cutting edge upon closure of said at least two mould components.

2. A method of moulding according to claim 1 wherein said pre-formed material is a generally concave thin walled component with a peripheral edge curved inwardly toward the center of said pre-formed material, said cutting edge trimming said peripheral edge flush with the plastic moulded on the internal surface of said pre-formed material.

3. A method of moulding according to claim 2 wherein said mould comprises a first female part, a second male part and an intermediate part that has a surface defining: (i) an aperture through which said male part locates and (ii) said undercut recess abuts against said inwardly curved peripheral edge of said pre-formed material.

4. A method of moulding according to claim 3 wherein said cutting edge abuts against a surface defining said aperture adjacent said undercut recess.

5. A method of moulding a plastic part in a mould having at least a male mould part, a female mould part, and an intermediate mould part, wherein said male mould part locates within said female mould part to form a mould cavity when said mould is closed, said intermediate mould part has a surface defining: (i) an aperture through which said male mould part locates and (ii) an undercut recess that locates adjacent the opening of said female mould part when said intermediate mould part is closed against said female mould part, comprising:
   locating a softened film of plastic over the recess of the female mould part,
   drawing a vacuum within the recess of said female mould part that causes said film of plastic to be vacuum formed onto the surface of said female mould part,
   partly closing said mould,
   injecting molten plastic into said mould cavity on one side of said plastic film, and closing said mould to force said molten plastic to fill said mould cavity and to bond to said one side of said plastic film, one of said mould parts having a cutting edge against which another part of said mould locates so that the cutting edge trims said plastic film around said cutting edge upon closure of said mould parts.

6. A method of moulding according to claim 5 wherein said cutting edge abuts against said surface defining said aperture adjacent said undercut recess.

7. A method of moulding a plastic part comprising:
   placing a first pre-formed material into a first half of a two part mould,
   partly closing said two halves of said mould,
   injecting molten plastic into said mould cavity on one side of said pre-formed material, and closing said two halves of said mould to force said molten plastic to fill said mould cavity and to bond to said pre-formed material, said two halves of said mould each having cutting edges that engage upon closing of said halves to trim said pre-formed material to a required size, wherein the surface of said first half of said two part mould has an undercut recess.

8. A method according to claim 7 wherein said cutting edges act to cut said pre-formed material by said cutting edges moving past one another.

9. A method of moulding a plastic part comprising:

locating a first pre-formed material into a first part of a mould having at least two parts that, when closed, form a mould cavity, wherein the surface of said first part of said mould has an undercut recess, and closing said mould and injecting molten plastic to fill said mould cavity and to bond to said one side of said pre-formed material, one part of said mould having a cutting edge that engages against and trims said pre-formed material around said cutting edge upon closure of said mould.

10. A method of moulding a plastic part in a mould having at least a male mould part, a female mould part, and an intermediate mould part, wherein said male mould part locates within said female mould part to form a mould cavity when said mould is closed, said intermediate mould part has a surface defining: (i) an aperture through which said male mould part locates and (ii) an undercut recess that locates adjacent the opening of said female mould part when said intermediate mould part is closed against said female mould part comprising:

locating a softened film of plastic over the recess of the female part of said mould, drawing a vacuum with in the recess of said female part of said mould that causes said film of plastic to be vacuum formed onto the surface of said female part of said mould, and closing said mould and injecting molten plastic to fill said mould cavity and to bond to said one side of said plastic film, one of said mould parts having a cutting edge against which another part of said mould locates so that the cutting edge trims said plastic film around said cutting edge upon closure of said mould parts.

11. A mould for moulding a plastic part comprising:

a first part of a mould having a cavity into which a pre-formed material is located, a second part of said mould that locates into the cavity of said first part and forms a mould cavity between said second part and said pre-formed material, a third intermediate mould part that locates between said first and second mould parts having a surface that defines: (i) an aperture through which said second part locates and (ii) an undercut recess that locates adjacent the opening of said first mould part when said intermediate mould part is closed against said first mould part, and a cutting edge on at least one of said parts of said mould that engages against and trims said pre-formed around said cutting edge upon closure of said mould components wherein said mould parts are party closed prior to molten plastic being injected into said mould cavity on one side of said pre-formed material and then fully closed to force said molten plastic to fill said mould cavity and to trim said pre-formed material.

12. A mould according to claim 11 wherein said pre-formed material is a generally concave thin walled material with a peripheral edge locating within said undercut when said intermediate mould part closes against said first mould part and said cutting edge trimming said peripheral edge flush with the plastic moulded on the internal surface of said pre-formed material.

13. A mould according to claim 11 wherein said cutting edge abuts against said surface defining said aperture adjacent said undercut recess.

14. A mould for moulding a plastic part comprising:

a first part of a mould having a cavity into which a pre-formed material is located, wherein the surface of said first half of said two part mould has an undercut recess, a second part of said mould that locates into the cavity of said first part and forms a mould cavity between said second part and said pre-formed material, and a cutting edge on said first and second mould parts that trim said pre-formed material around said cutting edges when said cutting edges engage upon closing of said first and second mould parts, wherein said mould parts are partly closed prior to molten plastic being injected into said mould cavity on one side of said pre-formed material and then fully closed to force said molten plastic to fill said mould cavity and to trim said pre-formed material.

15. A mould according to claim 14 wherein said cutting edges act to cut said pre-formed material by said cutting edges moving past one another.

16. A mould for moulding a plastic part comprising:

a first part of a mould having a cavity into which a pre-formed material is located, a second part of said mould that locates into the cavity of said first part and forms a mould cavity between said second part and said pre-formed material, a third part of said mould that has a surface defining: (i) an aperture through which said second part locates (ii) an undercut recess that locates adjacent said cavity of said first part when said third part is closed against said first part of said mould; and a cutting edge on at least one of said parts of said mould that engages against and trims said pre-formed material around said cutting edge upon closure of said mould parts wherein said mould parts are partly closed prior to molten plastic being injected into said mould cavity on one side of said pre-formed material.

* * * * *

UNITED STATES PATENT AND TRADEMARK OFFICE
CERTIFICATE OF CORRECTION

PATENT NO. : 6,849,225 B1  Page 1 of 1
DATED : February 1, 2005
INVENTOR(S) : Robert William Gilbert et al.

It is certified that error appears in the above-identified patent and that said Letters Patent is hereby corrected as shown below:

Column 1,
Lines 56 and 58, "preformed" should be -- pre-formed --.

Column 2,
Lines 27 and 41, "preformed" should be -- pre-formed --.

Column 4,
Line 6, "moulding" should be -- moulding, --.

Column 6,
Line 60, "against said surface" should be -- against a surface --.

Column 7,
Line 59, "pre-formed around" should be -- pre-formed component around --.

Signed and Sealed this

Eleventh Day of October, 2005

JON W. DUDAS
*Director of the United States Patent and Trademark Office*